Oct. 1, 1957  A. D. RHODES  2,807,937
SUBAQUEOUS PIPELINE BULKHEAD CONSTRUCTION
Filed July 15, 1954  3 Sheets-Sheet 1
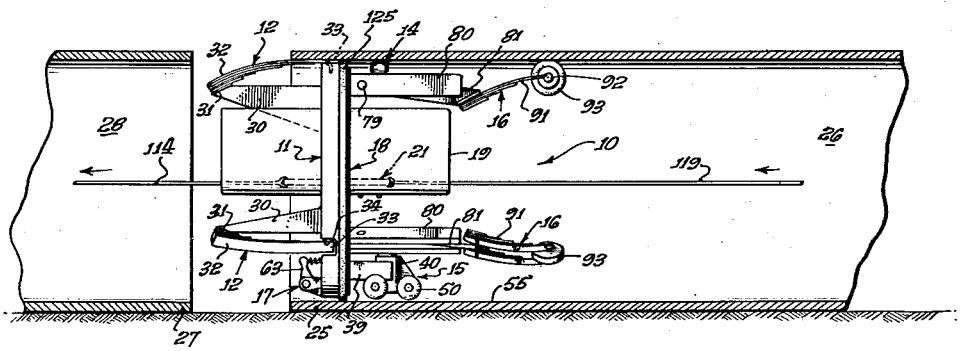
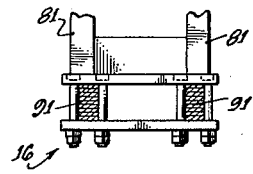
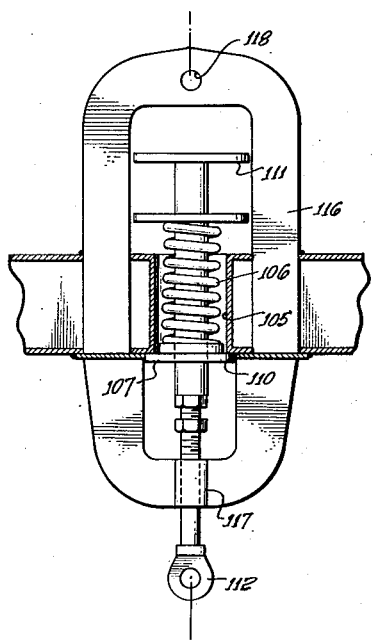
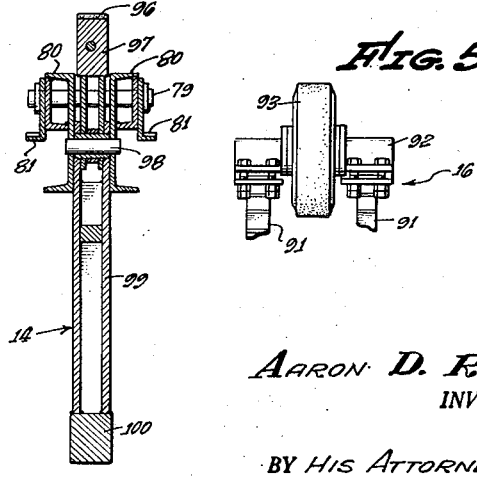
AARON D. RHODES,
INVENTOR.
BY HIS ATTORNEYS.
HARRIS, KIECH, FOSTER & HARRIS.

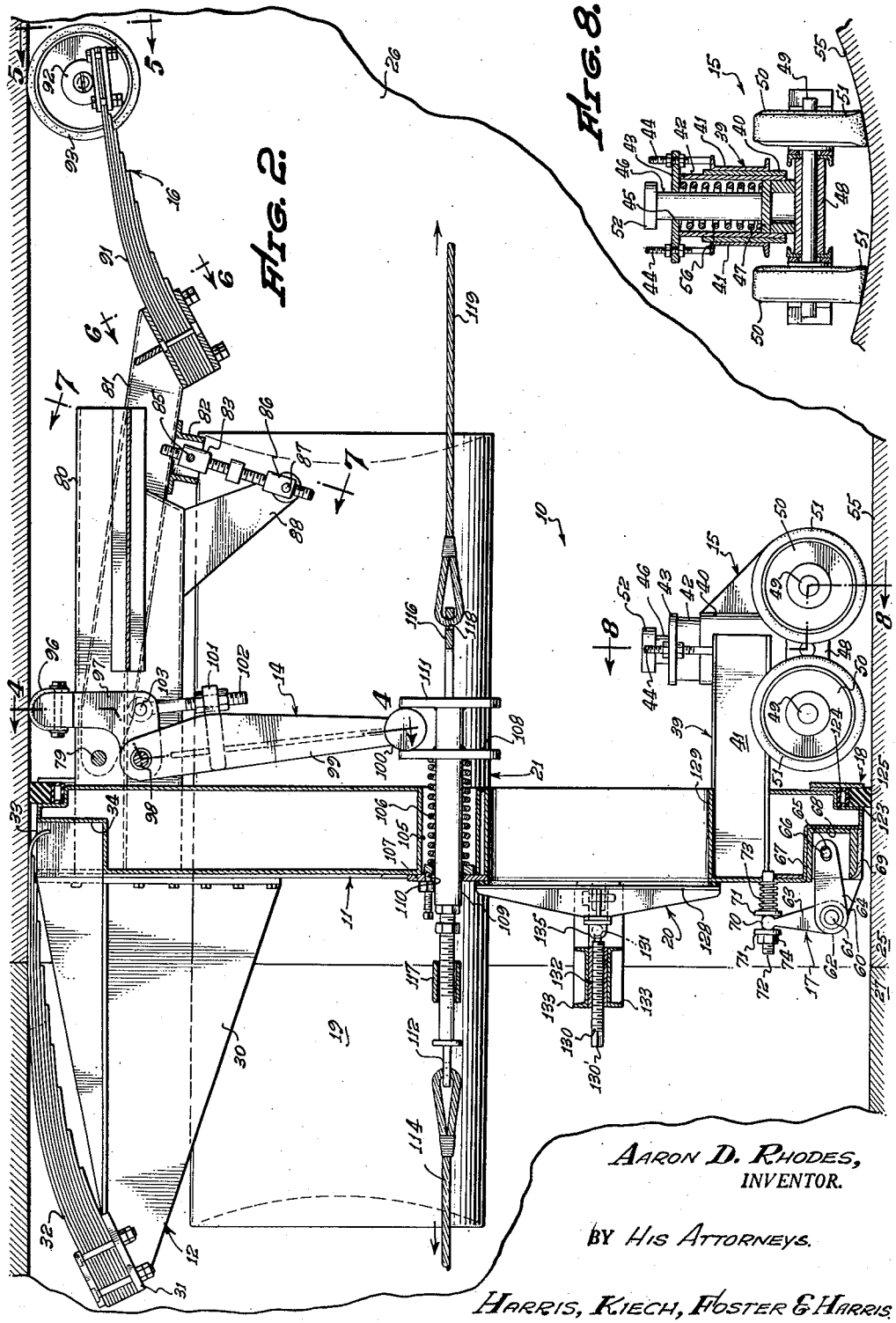

Oct. 1, 1957  A. D. RHODES  2,807,937
SUBAQUEOUS PIPELINE BULKHEAD CONSTRUCTION
Filed July 15, 1954  3 Sheets-Sheet 3
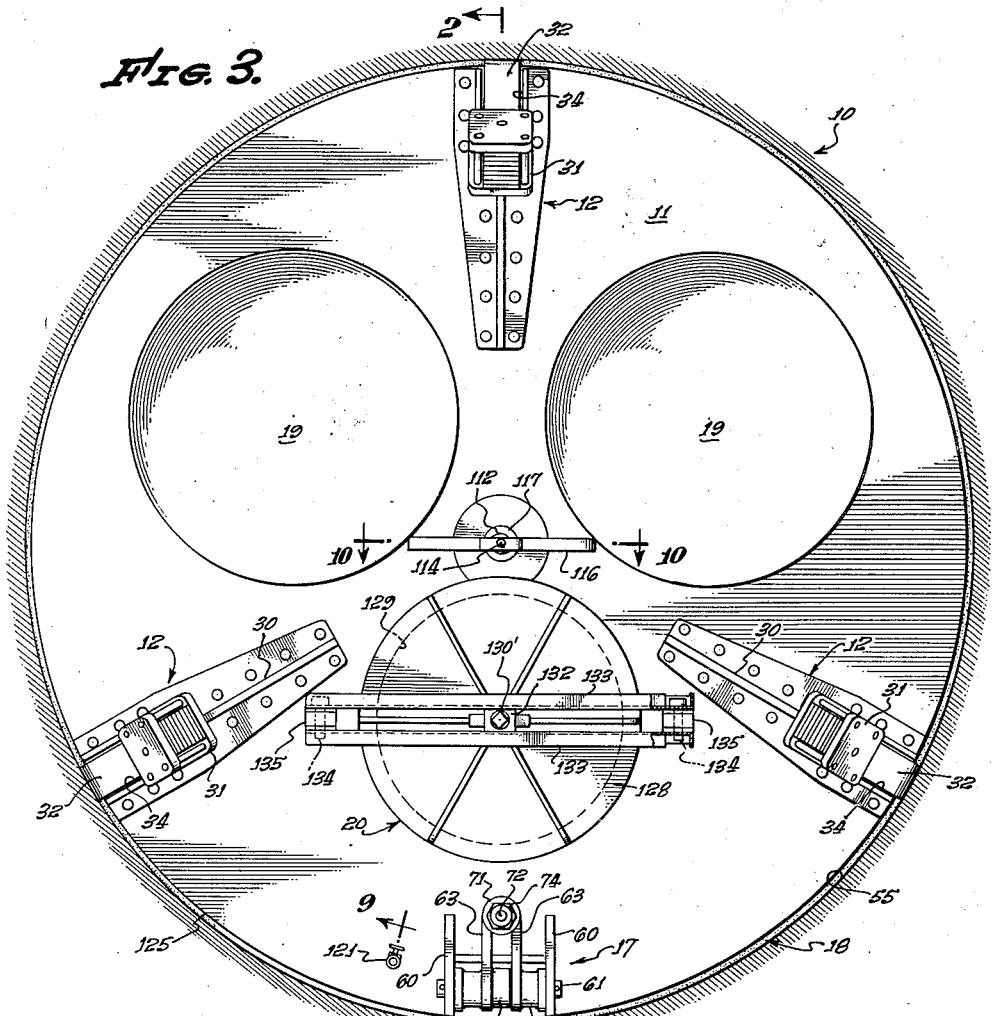
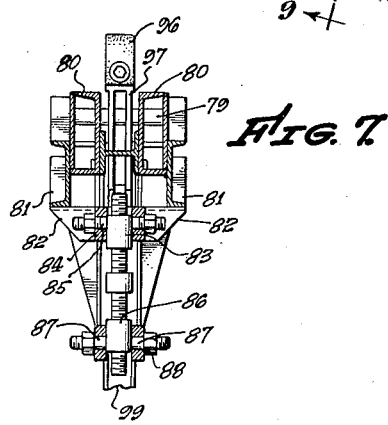
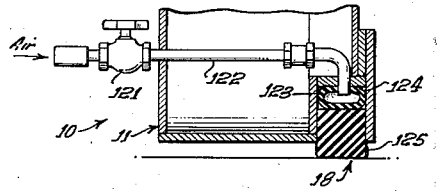
INVENTOR.
AARON D. RHODES,
BY HIS ATTORNEYS.
HARRIS, KIECH, FOSTER & HARRIS.

United States Patent Office 2,807,937
Patented Oct. 1, 1957

2,807,937

SUBAQUEOUS PIPELINE BULKHEAD CONSTRUCTION

Aaron D. Rhodes, Paramount, Calif., assignor to Macco Corporation, Paramount, Calif., a corporation of Nevada Application July 15, 1954, Serial No. 443,660

18 Claims. (Cl. 61—72)

Large quantities of undesired solids are frequently deposited in subaqueous pipes during the laying thereof as a result of the action of tidal or other water currents. It is an object of the present invention to provide a subaqueous pipeline bulkhead construction which can be used in closing off pipes which have been positioned beneath the surface of water as other connecting pipes are being laid adjacent thereto so as to prevent the deposit of solids within the already laid pipe. A related object is to produce a bulkhead of the class described which can be readily moved along the interior of a subaqueous pipe.

The invention may be briefly summarized as embodying a bulkhead to which there are attached various means serving to aid in the use of this bulkhead. The precise nature of the invention is defined by the claims forming a part of this specification. Further details of the invention will be apparent from the remainder of this specification, and the accompanying drawings, in which:

Fig. 1 is a side view of a subaqueous bulkhead of the invention illustrating the use of this bulkhead in a submerged pipe;

Fig. 2 is a cross-sectional view of this bulkhead taken at line 2—2 of Fig. 3 showing various constructional details;

Fig. 3 is an end view of the subaqueous bulkhead of the invention;

Fig. 4 is a cross-sectional view taken at line 4—4 of Fig. 2;

Fig. 5 is a partial view taken at line 5—5 of Fig. 2;

Fig. 6 is a cross-sectional view taken at line 6—6 of Fig. 2 of the drawings;

Fig. 7 is a cross-sectional view taken at line 7—7 of Fig. 2 of the drawings;

Fig. 8 is a partially cross-sectional view taken at line 8—8 of Fig. 2 of the drawings;

Fig. 9 is a partial cross-sectional view taken at line 9—9 of Fig. 3 of the drawings; and Fig. 10 is a cross-sectional view taken at line 10—10 of Fig. 3 of the drawings.

From an examination of the various figures of the drawings, particularly Figs. 1, 2 and 3, it is seen that the subaqueous bulkhead construction 10 of the invention is provided with a center bulkhead 11 to which there are attached three spring guides 12, locking arms 14, a steering device 15, and positioning devices 16. The bulkhead 11 also carries a braking construction 17, an edge sealing means 18, two air tanks 19, an access door or manhole 20, and a releasing structure 21 which is designed to be used in governing the use of the locking arms 14.

When the subaqueous bulkhead 10 of the present invention is used, this bulkhead is adapted to be positioned adjacent an end 25 of a pipe 26 which has already been laid beneath the surface of water being positioned in such a manner as to seal the interior of the pipe 26 against the entrance of undesired solids. When the bulkhead construction 10 is so positioned, the spring guides 12 project from the end 25 of the pipe 26 so as to serve to guide an end 27 of another pipe 28 against the end 25 of the pipe 26. The spring guides 12 each include metallic webs 30 attached to the bulkhead 11 by conventional attaching means. On ends 31 of these webs 30, there are secured leaf springs 32 which project generally back towards the bulkhead 11 at an angle. Each of these springs includes an end 33 positioned within an opening 34 in the bulkhead 11. It is readily seen from a detailed examination of Figs. 1 and 2 of the drawings that the springs 32 serve as an effective guide for the pipe 28 when this pipe is being laid in such a manner that the ends 25 and 27 are to be positioned adjacent one another. The springs 32 also serve in guiding the entire bulkhead construction 10 when this bulkhead construction is moved from one laid pipe into another.

Such motion of the bulkhead construction 10 is in part controlled by means of the steering device 15. This steering device 15 is attached to an appropriate bracket 39 carried on the side of the center bulkhead 11 remote from the spring guides 12 and includes upstanding cylindrical sleeve 40 which is mounted between sides 41 of the bracket 39 so as to be securely held thereby. Within this sleeve, there is positioned a second sleeve 42 attached at its upper surface to a top plate 43 whose position with respect to the sides 41 is determined by means of bolts 44 operating in what is believed to be an obvious manner. This top plate 43 has an internal aperture 45 within which there is disposed a shaft 46 leading to a piston 47 located within the sleeve 42 adjacent the lower end thereof. This piston is attached to an appropriate shaft-carrying carriage 48 which carries shafts 49 upon which there are mounted wheels 50. Preferably, these wheels 50 are provided with rubber tires 51 substantially as shown. The shaft 46 carries a steering knob 52 on the side of the top plate 43 remote from the carriage 48.

With this specific construction, the wheels 50 can be brought into engagement with an internal surface 55 of the pipe 26 so as to support the bulkhead 11 by merely adjusting the location of the top plate 43 by means of the bolts 44 so as to compress a spring 56 positioned within the sleeve 42 in order to force the carriage 48 and the attached wheels 50 against this surface 55. When the wheels 50 have been lowered in this manner, the direction of movement of these wheels can be controlled by means of the steering knob 52. The wheels 50 may be removed from the surface 55 by the reverse of the operations indicated.

The bulkhead construction 10 of the invention is in and of itself very bulky, and would be extremely unwieldy to move along the interior of a pipe if means were not provided which aid in supporting the weight of the bulkhead and in controlling its motion. The center bulkhead 11 is provided with two air tanks 19 which are designed to give buoyancy to the entire construction 10, enabling it to be readily handled beneath the surface of water. The center bulkhead 11 is also provided with a braking construction 17 which is intended to be used in controlling the movement of the bulkhead construction 10. This braking construction 17 consists of projecting lugs 60, attached to the center bulkhead 11, to which there is attached, by means of a pivot 61, a sleeve 62 (Fig. 3) carrying levers 63 and 64. The levers 64 are provided with slots 65 which are adapted to carry a pivot 66 mounted upon a brake box 67 positioned within a cavity 68 in the bulkhead 11. This brake box 67 is provided with an external surface 69 which is designed to be used in braking by being moved against the surface 55 of the pipe 26. The motion of this brake box 67 is governed by means of knobs 70 attached to the levers 63 sliding between collars 71 mounted upon a bolt 72 attached to the bulkhead center 11. A spring 73 is mounted between the center bulkhead 11 and the adjacent collar 71 for the purpose of forcing the collars 71 and the knobs 70 away from the center bulkhead 11. The motion of the collars 71 of the spring 73 is controlled by means of a common nut 74. When this nut 74 is moved towards the center bulkhead 11, the surface 69 is brought against the surface 55 and movement of the bulkhead construction 10 is retarded. When the nut 74 is moved in the other direction, these surfaces are parted, resulting in no braking action.

The portion of the bulkhead construction 10 within a pipeline is maintained during movement by the aid of at least three positioning devices 16 which are mounted on pivots 79 secured between braces 80 attached to the center bulkhead 11. Each of these positioning devices includes braces 81 attached to the pivots 79 on the outside of the adjacent braces 80. Crossbars 82 connect these braces 81 at points remote from the center bulkhead 11 so as to carry trunnions 83 projecting from a threaded bushing 84. A threaded shaft 85 is held within this bushing 84 and another bushing 86 in such a manner that as this shaft is turned it moves within both of these bushings. The other bushing 86 is provided with trunnions 87 which are normally carried upon supports 88 attached to the braces 80.

Secured to the braces 81 at points remote from the center bulkhead 11 are springs 91 of substantially the same type of construction as the springs 32, these springs having a greater resistance to bending adjacent the braces 81 than removed therefrom. These springs 91 carry at points remote from the center bulkhead 11 means 92 constituting bearings for wheels 93. The shaft 86 is normally adjusted so as to position these wheels 93 against the inner surface 55 of the pipe 26 in such a manner that they serve in aiding in maintaining the center bulkhead 11 in a substantially upright position. During movement of the bulkhead construction 10, adjustment of this shaft is, of course, from time to time necessary.

When the bulkhead construction 10 is to be used in sealing a pipe as previously indicated, at least three locking arms 14 are employed in order to hold the entire construction rigidly within the pipe. Each of these locking arms includes an outer braking surface 96 attached to a lever 97 which is connected by means of a pivot 98 to adjacent braces 80. This pivot 98 also carries a lever 99 having a cylindrically-shaped end 100 positioned adjacent the center of the center bulkhead 11 as shown, and a projecting lug 101 which carries a bolt 102, one end of which pivotally carries an eye-bolt 102, the eye of which is positioned around a shaft 103 attached to the adjacent levers 97. By this construction, as the lever 99 is moved in a counterclockwise direction, as view in Fig. 2, the surface 96 will be wedged against the interior 55 of the pipe 26. When it is moved in the opposite direction, the opposite result will, of course, follow.

In order to control movement of the locking arms 14, there is provided within the center of the center bulkhead 11 an opening 105 within which there is disposed the releasing structure 21 including a spring 106, one end of which projects against a flat plate 107 secured to the center bulkhead 11, and the other end of which projects against a flange 108 carried by a shaft 109 projecting through the opening 105 and through an appropriate opening 110 within the plate 107. Attached to the shaft 109 is a second flange 111 which, together with flange 108, serves to hold the ends 100 of the levers 99 so that these ends can only move as the shaft 109 is moved. This shaft 109 is connected to an eye-bolt 112 which in turn is connected to an appropriate rope or cable 114.

As the rope or cable 114 is pulled to the left, as the device of the invention is viewed in Fig. 2 of the drawings, the spring 106 is compressed and the shaft 109 is moved causing the ends 100 to be moved toward the center bulkhead 11, releasing the locking arms 14 from the interior surface 55 of the pipe 26 so that the entire bulkhead construction 10 can be moved. The pull exerted upon the rope 114 is further conveyed to the bulkhead construction 10 through the various mechanical parts shown as the spring 106 is compressed, and is conveniently used to move the bulkhead construction 10 as herein described. When the pull on this rope 114 is released, the spring 106 will serve to force the shaft 109 back to its original position, as indicated, forcing the locking arms 14 against the interior 55 of the pipe 26.

A double-ended yoke 116 is mounted around the opening 105 (Fig. 10) so as to project from both sides of the center bulkhead 11. This yoke 116 provides a guide bearing 117 for the eye-bolt 112. The end of this yoke on the side of the center bulkhead 11 remote from the rope 114 is provided with an opening 118 which is designed to contain an end of another rope 119 which can be used for various purposes in handling or otherwise positioning the center bulkhead 11. Movement of the locking arms 14 is not generally affected by pull on the rope 119, although a pull on this rope may serve to further seat these locking arms against the interior surface 55 of the pipe 26 when the device of the invention is used.

When the entire bulkhead construction 10 of the invention is temporarily positioned in a location where it is desired that this bulkhead construction 10 be used to seal a pipe against the entrance of solids carried by various water currents, it is desirable to use edge sealing means 18 provided within the center bulkhead 11. This edge sealing means 18 includes a valve 121 (Fig. 9) leading to a pipe 122 mounted in the center bulkhead 11. The pipe 122 in turn is connected to an inflatable tire 123 positioned within an appropriate groove 124 formed circumferentially around the center bulkhead 11. This groove, as is most apparent in Figs. 2 and 9 of the drawings, is open towards the surface 55 of the pipe 26. Within the groove 124 there is positioned an elastomeric sealing ring 125 of rubber or like material. When the sealing means 18 is employed, the inflatable tire 123 is inflated by means of air or other fluids being admitted through the valve 121. This in turn causes the sealing ring 125 to be pushed from the groove 124 against the surface 55 of the pipe, forming a very effective seal against the entrance of undesired solids beyond this sealing ring. When the bulkhead construction 10 is to be moved, the sealing ring 125 can be withdrawn into the groove 124 by permitting the fluid within the tire 123 to escape. Obviously, if the center bulkhead 11 is formed so as to fit very closely within the pipe 25, the sealing means 18 of the invention may be dispensed with, although this, as a rule, is not considered practical.

The center bulkhead 11 is provided with an access door or manhole which comprises a closure plate 128 which is adapted to be positioned over an opening 129 within the center bulkhead 11 so as to seal this opening against the entrance of liquid or air. The closure plate 128 when used is held in position by means of a threaded shaft 130 having a square end 130' which is connected to the center part of the plate 128 by a universal connection 131. The shaft 130 projects through a bushing 132 held between support braces 133, and may be adjusted with respect to this bushing by the use of the square end 130'; these support braces are held by bolts 134 (Fig. 3) to lugs 135 attached to the bulkhead 11 on both sides of the opening 129. By virtue of this construction, either of the bolts 134 may be removed from the location indicated, and the support braces 133 can be rotated about the other of the bolts permitting removal of the closure 128 from the opening 129 and permitting an individual, such as, for example, a diver, to go through the center bulkhead 11 for any necessary purpose. Those skilled in the art will realize that it is possible to dispense with the access door or manhole 20 when the bulkhead construction 10 of the invention is of comparatively small size, or when for other reasons it is not desired to have an individual be able to go from one side of the bulkhead to the other during use of this construction.

From a detailed analysis of the device shown in the accompanying figures, it will be at once realized that the construction illustrated is extremely effective for the purpose described. Further, it is apparent that a number of comparatively minor modifications may be made within the specific construction shown without departing from the basic features of this invention. As an example of such modifications, the structure of the steering device 15, the positioning device 16, or the braking construction 17, may be altered from the specific construction shown in a number of manners. Structures altered in this way will be able to accomplish the same result as the specific means illustrated, and, insofar as such altered structures are satisfactory, they are to be considered as part of the invention defined by the appended claims.

The bulkhead construction 10, under many circumstances, can be employed so as to move in either direction within a pipe to a location where it is desired to seal the bulkhead against the movement of solids past the bulkhead construction. Normally, the bulkhead construction is, however, moved by means of force exerted on the cable 114 in the general direction indicated by the arrows in Fig. 1 of the drawings. When the edge sealing means 18 are disengaged from the internal surface of a pipe, and when the locking arms 14 are released from this surface, it is possible to easily and conveniently move the entire bulkhead construction 10 utilizing the steering device 15 for the obvious purpose. This steering device also during such movement serves to support the remainder of the bulkhead construction. The alignment of this bulkhead construction 10 within a pipe during movement is maintained by means of positioning devices 16. During such movement, the spring guides 12 serve to guide the bulkhead 11. When the bulkhead has been moved to any desired location, the locking arms 14 are positioned against the internal surface of a pipe and the bulkhead 11 is sealed against the pipe as previously indicated.

I claim as my invention:

1. A new and improved subaqueous pipeline bulkhead construction which is designed to be used to close off pipes which have been positioned beneath the surface of water as other pipes are being laid to connect thereto in order to prevent the deposit of solids carried by fluid currents within the laid pipe, said pipeline bulkhead construction including: a bulkhead; spring guides attached to one side of said bulkhead, said spring guides serving to guide said bulkhead construction during the movement thereof from one pipe to an adjacent pipe, and serving to guide the pipe being laid; means attached to said bulkhead for holding said bulkhead in an upright position within a pipe; means attached to said bulkhead for locking said bulkhead in position; a steering device attached to said bulkhead; and means for sealing the edge of said bulkhead against the interior surface of a pipe so as to prevent the entrance of solids into said pipe past said bulkhead.

2. A subaqueous pipeline bulkhead construction as defined in claim 1, including: air tanks attached to said bulkhead, said air tanks being designed to give buoyancy to the entire subaqueous pipeline bulkhead construction, enabling it to be readily handled beneath the surface of water.

3. A subaqueous pipeline bulkhead construction as defined in claim 1, wherein said bulkhead includes: an opening; an access door; and means connecting said access door with said bulkhead whereby said access door may be used to close said opening.

4. A subaqueous pipeline bulkhead construction as defined in claim 1, wherein said bulkhead is provided with a circumferential groove, and wherein said means for sealing the edge of said bulkhead against the interior surface of a pipe include an elastomeric sealing ring disposed within said groove, and means for forcing said elastomeric sealing ring outwardly from said groove against the interior surface of the pipe.

5. A subaqueous pipeline bulkhead construction as defined in claim 4, wherein said means for forcing said elastomeric sealing ring outwardly from said groove includes an inflatable tire positioned within said groove beneath said elastomeric sealing ring, and means for introducing a fluid into said inflatable tire.

6. A subaqueous pipeline bulkhead construction as defined in claim 1, wherein said means attached to said bulkhead for holding said bulkhead in an upright position within a pipe include a plurality of positioning devices attached to one side of said bulkhead adjacent the circumference thereof, each of said positioning devices including a brace pivotally mounted with respect to said bulkhead, means for moving said brace about said pivot, a spring attached to said brace at a point remote from said bulkhead, and a wheel rotatably attached to each of said springs at a point remote from said brace, the entire brace, spring and wheel construction being designed to be moved during the use of said subaqueous pipeline bulkhead construction so that at all times during such use said wheel is in contact with the internal surface of a pipe supporting said bulkhead.

7. A subaqueous pipeline bulkhead construction as defined in claim 1, wherein said means attached to said bulkhead for locking said bulkhead in position include a plurality of lever means pivotally connected to said bulkhead, each of said lever means having a surface adapted to bear against a surface of a pipe within which said subaqueous pipeline bulkhead construction is disposed.

8. A subaqueous pipeline bulkhead construction as defined in claim 7, in which said lever means includes means positioned adjacent to the center of said bulkhead construction for moving said surface of said lever means, the bulkhead construction including a shaft projecting through the center of said bulkhead, flange means attached to said shaft on opposite sides of said means positioned adjacent to the center of said bulkhead construction, and spring means serving to normally position said shaft so that said means positioned adjacent to the center of said bulkhead construction are held so as to force said surfaces on said lever means against a surface of a pipe in which said subaqueous pipeline bulkhead construction is disposed.

9. A subaqueous pipeline bulkhead construction as defined in claim 1, wherein said steering device includes: wheels; means for holding said wheels with respect to said bulkhead; means for moving said wheels with respect to said bulkhead so as to bring said wheels into engagement with a pipe surface; and means for steering said wheels with respect to said bulkhead.

10. A subaqueous pipeline bulkhead construction as defined in claim 1, including means capable of serving as a brake attached to said bulkhead, said means capable of serving as a brake being designed to be used in controlling movement of said bulkhead construction.

11. A new and improved subaqueous pipeline bulkhead construction, including: a bulkhead; means attached to said bulkhead for holding said bulkhead in an upright position within a pipe, said means including a plurality of arms extending substantially perpendicular from said bulkhead with spring means for urging the end of said arm outward for engagement with the inner wall of a pipe; and means attached to said bulkhead for locking said bulkhead in a position within said pipe.

12. A new and improved subaqueous pipeline bulkhead construction, including: a bulkhead; guide means attached to one side of said bulkhead, said guide means serving to guide said bulkhead construction during movement thereof within a pipe; means attached to said bulkhead for holding said bulkhead in an upright position within a pipe; and means attached to said bulkhead for locking said bulkhead in a position within said pipe.

13. A new and improved subaqueous pipeline bulkhead construction, including: a bulkhead; guide means attached to one side of said bulkhead, said guide means serving to guide said bulkhead construction during movement thereof within a pipe; means attached to said bulkhead for holding said bulkhead in an upright position within a pipe; means attached to said bulkhead for locking said bulkhead in a position within said pipe; and means for steering said bulkhead as said bulkhead is moved within said pipe.

14. A new and improved subaqueous pipeline bulkhead construction, including: a bulkhead; guide means attached to one side of said bulkhead, said guide means serving to guide said bulkhead construction during movement thereof within a pipe; means attached to said bulkhead for holding said bulkhead in an upright position with respect to said pipe; means attached to said bulkhead for locking said bulkhead in a position within said pipe; means for steering said bulkhead as said bulkhead is moved within said pipe; and means for sealing the edge of said bulkhead against the inner surface of said pipe so as to prevent the movement of material past said bulkhead.

15. A new and improved subaqueous pipeline bulkhead construction, including: a bulkhead; guide means attached to one side of said bulkhead, said guide means serving to guide said bulkhead construction during movement thereof within a pipe; means attached to said bulkhead for holding said bulkhead in an upright position with respect to said pipe; means for steering said bulkhead as said bulkhead is moved within said pipe; and means for sealing the edge of said bulkhead against the inner surface of said pipe so as to prevent the movement of material past said bulkhead.

16. A new and improved subaqueous pipeline bulkhead construction, including: a bulkhead; guide means attached to one side of said bulkhead for engaging the inner wall of a pipe, said guide means serving to guide said bulkhead during movement thereof within a pipe; means attached to said bulkhead for holding said bulkhead in an upright position with respect to said pipe; and means for sealing the edge of said bulkhead against the inner surface of said pipe so as to prevent the movement of material past said bulkhead.

17. A new and improved pipeline bulkhead construction, including: a bulkhead; means attached to said bulkhead for holding said bulkhead in an upright position within a pipe, said means including a plurality of arms extending substantially perpendicular from said bulkhead with spring means for urging the end of said arm outward for engagement with the inner wall of a pipe; and means for sealing the edge of said bulkhead against the inner surface of said pipe so as to prevent the movement of material past said bulkhead.

18. A new and improved pipeline bulkhead construction, including: a bulkhead; guide means attached to one side of said bulkhead for engaging the inner wall of a pipe, said guide means serving to guide said bulkhead during movement thereof within a pipe; and means attached to said bulkhead for holding said bulkhead in an upright position with respect to said pipe.

References Cited in the file of this patent

UNITED STATES PATENTS

| 467,927 | Falcon | Feb. 2, 1892 |
| 744,362 | Kondolf | Nov. 17, 1903 |
| 1,478,303 | Snyder | Dec. 18, 1923 |
| 1,874,081 | Burrows | Aug. 30, 1932 |
| 2,156,651 | Gardiner | May 2, 1939 |

FOREIGN PATENTS

| 361,292 | Great Britain | May 10, 1930 |